US009544854B2

(12) United States Patent
Kim et al.

(10) Patent No.: US 9,544,854 B2
(45) Date of Patent: Jan. 10, 2017

(54) APPARATUS AND METHOD FOR REDUCING CURRENT CONSUMPTION IN A PORTABLE TERMINAL

(75) Inventors: Soo-Hyung Kim, Gyeonggi-do (KR);
Dae-Chul Kang, Gyeonggi-do (KR);
Jae-Ho Hwang, Gyeonggi-do (KR);
Hai-Min Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 178 days.

(21) Appl. No.: 13/304,949

(22) Filed: Nov. 28, 2011

(65) Prior Publication Data
US 2012/0239954 A1 Sep. 20, 2012

(30) Foreign Application Priority Data
Mar. 17, 2011 (KR) .................. 10-2011-0024027

(51) Int. Cl.
*G06F 1/00* (2006.01)
*H04W 52/02* (2009.01)
*G06F 1/32* (2006.01)

(52) U.S. Cl.
CPC ........ *H04W 52/0287* (2013.01); *G06F 1/3203* (2013.01); *G06F 1/324* (2013.01); *Y02B 60/1217* (2013.01)

(58) Field of Classification Search
CPC .... G06F 1/3203; G06F 1/324; Y02B 60/1217; H04W 52/0587
See application file for complete search history.

(56) References Cited

U.S. PATENT DOCUMENTS

| 5,142,684 A | * | 8/1992 | Perry et al. .................... 713/320 |
| 5,774,704 A | * | 6/1998 | Williams .................. G06F 1/08 |
| | | | 713/501 |
| 7,069,463 B2 | * | 6/2006 | Oh ................................ 713/503 |
| 7,702,937 B2 | * | 4/2010 | Oh et al. ........................ 713/322 |
| 2003/0023890 A1 | * | 1/2003 | Na et al. ........................ 713/323 |
| 2003/0226047 A1 | * | 12/2003 | Park et al. .................... 713/300 |
| 2005/0223249 A1 | * | 10/2005 | Samson ........................ 713/320 |
| 2006/0047987 A1 | * | 3/2006 | Prabhakaran et al. ........ 713/322 |

(Continued)

FOREIGN PATENT DOCUMENTS

| JP | 2005-184648 A | 7/2005 |
| JP | 2006-178854 A | 7/2006 |

(Continued)

OTHER PUBLICATIONS

Japanese Notice of Allowance dated Apr. 26, 2016.

*Primary Examiner* — Mohammed Rehman
*Assistant Examiner* — Gayathri Sampath
(74) *Attorney, Agent, or Firm* — Cha & Reiter, LLC

(57) ABSTRACT

An apparatus and method for reducing current consumption in a portable terminal are provided, in which upon generation of a task, a controller transitions to a Virtual Maximum Clock (VMC) level and changes a clock level from the VMC level according to a load state of the controller, to process the task. Moreover, the controller changes the clock level by at least one of transition from the VMC level to an RMC level, a stepwise increase from the VMC level, a stepwise decrease from the VMC level, and a hold at the VMC level, according to the load state of the controller.

10 Claims, 5 Drawing Sheets

(56) References Cited

U.S. PATENT DOCUMENTS

| | | | |
|---|---|---|---|
| 2006/0271801 A1 | 11/2006 | Kano | |
| 2008/0028249 A1* | 1/2008 | Agrawal | 713/501 |
| 2008/0279260 A1 | 11/2008 | Yeh et al. | |
| 2008/0279560 A1 | 11/2008 | Osawa et al. | |
| 2008/0307248 A1* | 12/2008 | Amano | G06F 1/08 713/600 |
| 2009/0049314 A1* | 2/2009 | Taha et al. | 713/300 |
| 2009/0204830 A1* | 8/2009 | Frid et al. | 713/322 |
| 2010/0037080 A1 | 2/2010 | Kawashima | |
| 2010/0185878 A1* | 7/2010 | Rozen et al. | 713/300 |

FOREIGN PATENT DOCUMENTS

| | | |
|---|---|---|
| JP | 2010-39791 A | 2/2010 |
| WO | 2010/097885 A1 | 9/2010 |

* cited by examiner

APPARATUS AND METHOD FOR REDUCING CURRENT CONSUMPTION IN A PORTABLE TERMINAL

CLAIM OF PRIORITY

This application claims priority under 35 U.S.C. §119(a) from a Korean Patent Application filed in the Korean Intellectual Property Office on Mar. 17, 2011 and assigned Serial No. 10-2011-0024027, the contents of which are incorporated herein by reference in its entirety.

BACKGROUND OF THE INVENTION

1. Field of the Invention

The present invention relates to an apparatus and method for reducing current consumption in a portable terminal. More particularly, the present invention relates to an apparatus and method for reducing current consumption in a portable terminal in such a manner that the current consumption of a controller can be optimized.

2. Description of the Related Art

A conventional portable terminal processes a task in an on-demand scheme. The conventional on-demand scheme is a variable clock scheme in which if a task is generated at the lowest clock level, the task is processed by jumping from the lowest clock level to the highest clock level at one time and the highest clock level is dropped stepwise after the task is completed.

A shortcoming with the on-demand scheme is that once a task is generated, an unconditional jump to the highest clock level irrespective of load leads to an unnecessary increase in clock level or input voltage, thereby increasing the current consumption (i.e. thereby reducing power usage) of a portable terminal.

SUMMARY OF THE INVENTION

An aspect of the exemplary embodiments of the present invention is to address at least some of the problems and/or disadvantages and to provide at least the advantages described below. Accordingly, an aspect of the exemplary embodiments of the present invention is to provide an apparatus and method for reducing current consumption (thereby reducing power consumption) in a portable terminal, so as to optimize the current consumption of a controller.

Another aspect of the exemplary embodiments of the present invention is to provide an apparatus and method for reducing current consumption in a portable terminal, which can increase the use time of the portable terminal by optimizing the clock level and input voltage of a controller without unnecessarily increasing them.

A further aspect of the exemplary embodiments of the present invention is to provide an apparatus and method for reducing current consumption in a portable terminal, in an improved on-demand scheme that can optimize the current consumption of a controller.

In accordance with an exemplary embodiment of the present invention, there is provided an apparatus for reducing current consumption in a portable terminal, in which upon generation of a task, a controller transitions to a Virtual Maximum Clock (VMC) level and changes a clock level from the VMC level according to a load state of the controller, to process the task.

In accordance with another exemplary embodiment of the present invention, there is provided a method for reducing current consumption in a portable terminal, in which upon generation of a task, a Virtual Maximum Clock (VMC) level is transitioned to, and the task is processed by changing a clock level from the VMC level according to a load state of a controller.

BRIEF DESCRIPTION OF THE DRAWINGS

The above and other exemplary objects, features and advantages of certain embodiments of the present invention will become more apparent from the following detailed description taken in conjunction with the accompanying drawings, in which.

Throughout the drawings, the same drawing reference numerals will be understood to refer to the same elements, features and structures.

DETAILED DESCRIPTION

Reference will now be made in detail to the preferred exemplary embodiments of the present invention with reference to the accompanying drawings. In addition, a detailed description of generally known functions and structures may not be included when their inclusion could obscure appreciation of the subject matter of the present invention by a person of ordinary skill in the art.

Figure 1:
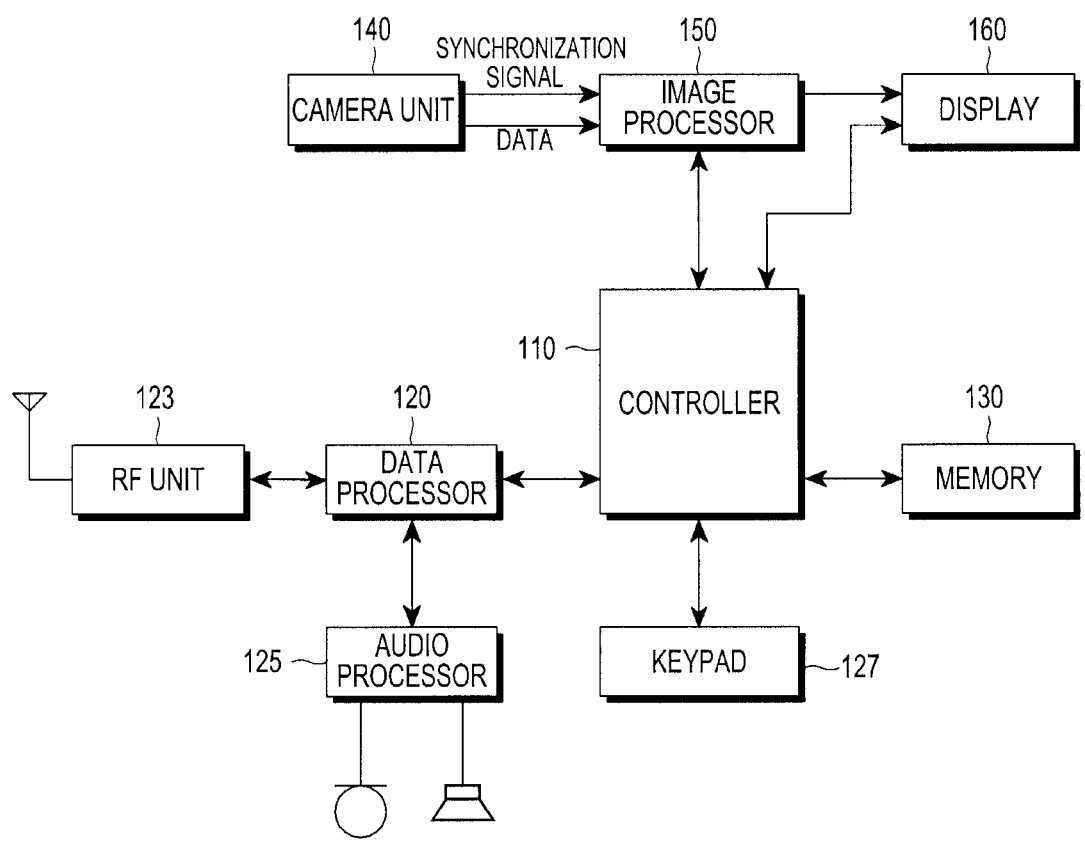
FIG. 1 is a block diagram of a portable terminal according to an exemplary embodiment of the present invention.

FIG. 1 is a block diagram of a portable terminal according to an exemplary embodiment of the present invention.

Referring now to FIG. 1, a Radio Frequency (RF) unit 123 performs a wireless communication function for the portable terminal under at least one of a plurality of protocols, including but not limited in any way to CDMA, GSM, TDMA, Bluetooth, 802.11, WiMAX, WiBRO, WAP, etc. The RF unit 123 preferably includes a transceiver or an RF transmitter for upconverting the frequency of a transmission signal and amplifying the upconverted transmission signal and an RF receiver for low-noise-amplifying a received signal and downconverting the frequency of the low-noise-amplified signal. A data processor 120 which includes a processor or microprocessor preferably includes a transmitter for encoding and modulating the transmission signal and a receiver for demodulating and decoding the received signal. More particularly, the data processor 120 may include a MODEM and a CODEC. The CODEC includes a data CODEC for processing packet data and an audio CODEC for processing an audio signal such as voice. An audio processor 125 reproduces a received audio signal output from the audio CODEC of the data processor 120 or transmits a transmission audio signal generated from a microphone to the audio CODEC of the data processor 120.

A keypad 127 preferably includes alphanumerical keys for inputting digits and characters and function keys for setting various functions.

A memory 130 may include, for example, a program memory and a data memory. The program memory may store programs required to control typical operations of the portable terminal and programs required for controlling a change from a preset Virtual Maximum Clock (VMC) level to another clock level according to the load state of a controller 110.

In accordance with the exemplary embodiment of the present invention, the memory 130, which is a non-transitory memory, stores information about load states of the controller 110 set in the portable terminal.

The load states of the controller 110 are defined as including a first load state (a very heavy load state), a second load state (a heavy load state), a third load state (a light load state), and a fourth load state (a very light load state) in the exemplary embodiment of the present invention. These states are defined according to the ranges of the controller as specified hereinbelow. These load states may also set as relative values to each other.

The load of the controller 110 is 90% or above in the first load state, 70% or above and below 90% in the second load state, 50% or above and below 70% in the third load state, and below 50% in the fourth load state.

The specific load values of the controller 110 may vary according to the characteristics of the controller 110 and an Operating System (OS). The load state classification and the number of load states may vary with VMC levels. A VMC level is preset as a level lower than a Real Maximum Clock (RMC) level, which varies according to the performance of the controller 110.

The controller 110 provides overall control to the portable terminal, and typically contains a processor microprocessor.

In accordance with the exemplary embodiment of the present invention, upon generation of a task, the controller 110 increases its clock level from a minimum clock level to a predetermined VMC level that is higher than the minimum clock level and then controls processing of the task by changing the clock level from the VMC level according to the load state of the controller 110. Herein, the controller 110 controls transition from the optimum clock level to the VMC level in an on-demand scheme.

The controller 110 also presets a clock level that is lower than an RMC level as the VMC level. The controller 110 may change the VMC level according to its performance as far as the VMC level is lower than the RMC level.

In addition, the controller 110 controls the task to be processed by at least performing one of an increase from the VMC level to the RMC level, a stepwise increase or a decrease from the VMC level, and a hold at the VMC level.

More specifically, the controller 110 transitions from the VMC level to the RMC level, or increases or decreases its clock level from the VMC level, in an on-demand or conservative scheme.

Upon completion of the task at the clock level changed from the VMC level according to the load state of the controller 110, the controller 110 then decreases the clock level stepwise in the on-demand scheme.

When the load states of the controller 110 are set in the memory 130 as the first load state (very heavy load), the second load state (heavy load), the third load state (light load), and the fourth load state (very light load), the controller 110 determines a load state corresponding to its current load according to the embodiment of the present invention. The load states can be, for example relative to each other.

If the current load corresponds to the first load state (controller load≥90%), the controller 110 processes the task by transitioning from the VMC level to the RMC level. If the current load corresponds to the second load state (90%>controller load≥70%), the controller 110 processes the task by increasing its clock level from the VMC level by one level. If the current load corresponds to the third load state (70%>controller load≥50%), the controller 110 processes the task at the VMC level. If the current load corresponds to the fourth load state (50%>controller load), the controller 110 processes the task by decreasing the clock level from the VMC level by one level. A person of ordinary skill in the art should understand and appreciate that these values for the load states are approximations and can be larger or smaller ranges and not strict ranges as specified herein above.

With continued reference to FIG. 1m a camera unit 140 includes a camera sensor for capturing an image and converting the captured optical signal to an electrical signal, and a signal processor for converting the analog image signal captured through the camera sensor to digital data. Herein, the camera sensor is presumably comprises a Charge Coupled Device (CCD) or a Complementary Metal Oxide Semiconductor (CMOS) sensor and the signal processor may be configured as a Digital Signal Processor (DSP). The camera sensor and the signal processor may be incorporated into a single device or separately configured.

An image processor 150, which typically includes a processor or microprocessor) performs Image Signal processing (ISP) to display an image signal received from the camera unit 140 on a display 160. The ISP preferably processes functions such as gamma correction, interpolation, spatial change, image effects, image scaling, Auto White Balance (AWB), Auto Exposure (AE), Auto Focus (AF), etc. Therefore, the image processor 150 processes the image signal received from the camera unit 140 on a frame basis and outputs the frame image data according to the characteristics and size of the display 160. The image processor 150 preferably includes a video CODEC for compressing frame image data to be displayed on the display 160 in a predetermined scheme or decompressing compressed frame image data to the original frame image data. The video CODEC may be a JPEG CODEC, an MPEG4 CODEC, or a Wavelet CODEC. An artisan appreciates herein that that the image processor 150 is presumed to be equipped with an On Screen Display (OSD) function, and the image processor 150 may output OSD data according to the size of a displayed screen under the control of the controller 110.

The display 160 displays the image signal received from the image processor 150 on a screen and also displays user data received from the controller 110. The display 160 may be configured with a Liquid Crystal Display (LCD). However, another other type of thin film technology can be used, including but not limited in any way to LED, OLED AMOLED, etc. In this case, the display 160 may include an LCD controller, a memory for storing image data, and an LCD device. If the LCD is configured into a touch screen, it may serve as an input unit. Thus, the display 160 may display the same keys as those of the keypad 127.

Now a detailed description will be given of an operation for optimizing the current consumption of the controller in the portable terminal with reference to FIGS. 2 to 6C.

Figure 2:
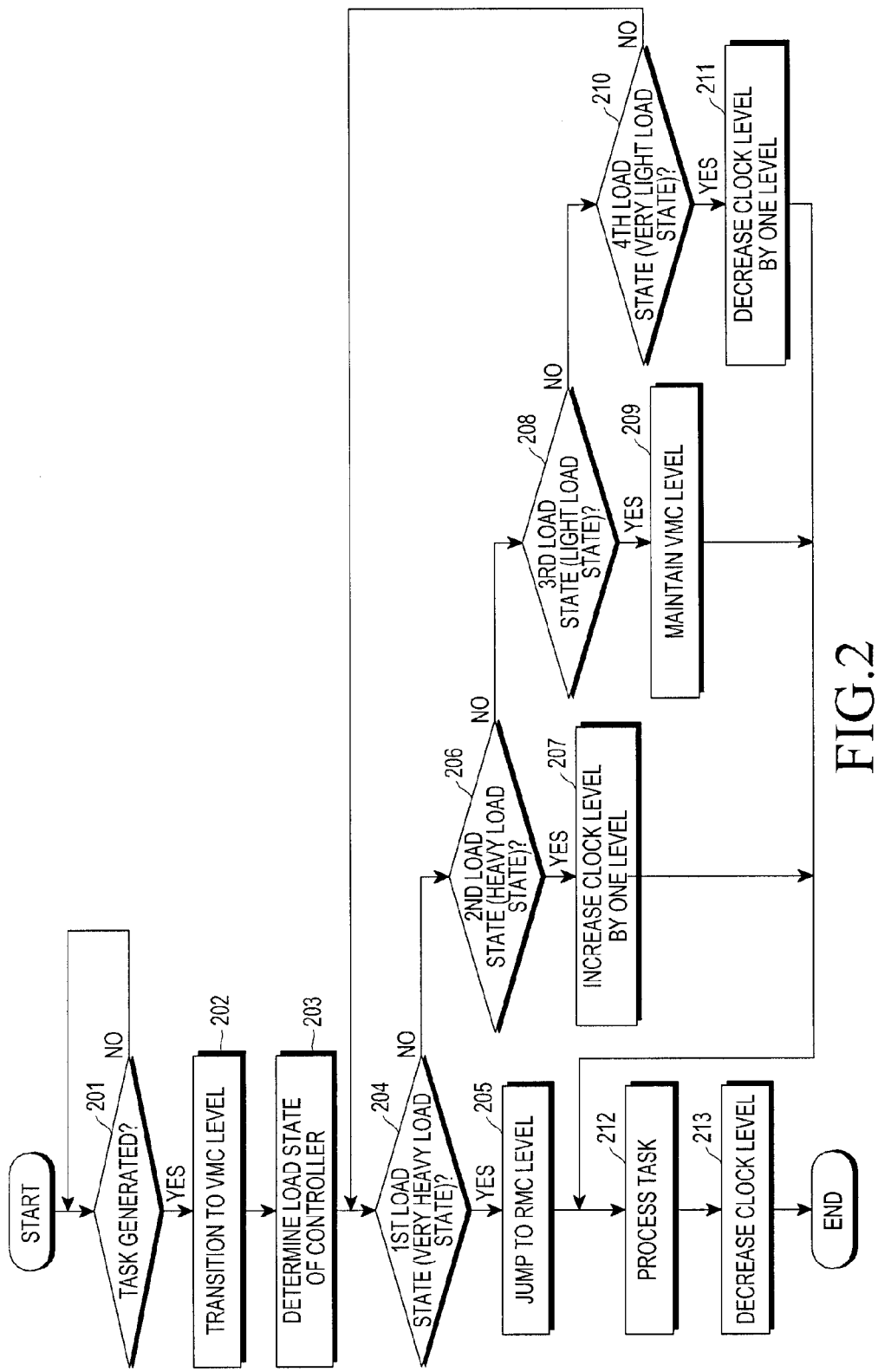
FIG. 2 is a flowchart illustrating an operation for reducing the current consumption of a controller in the portable terminal according to an exemplary embodiment of the present invention.

FIG. 2 is a flowchart illustrating an operation for reducing the current consumption of the controller in the portable terminal according to an exemplary embodiment of the present invention.

While the exemplary embodiment of the present invention will be described in the context that the load states of the controller are classified into the first load state (controller load≥90%), the second load state (90%>controller load≥70%), the third load state (70%>controller load≥50%), and the fourth load state (50%>controller load), it is to be understood that the load values of the controller 110 may be changed according to the characteristics of the controller 110 and the OS. In addition, the load state classification and the number of load states for the controller 110 may vary with VMC levels and a clock level lower than the RMC level is preset as a VMC level. The VMC level may be variable according to the performance of the controller 110.

The exemplary embodiment of the present invention will now be described in greater detail with reference to FIGS. 1 and 2.

Referring now to FIG. 2, at (S201) upon generation of a task in the portable terminal, the controller 110 determines its load. If the load is equal to or higher than a predetermined value, then at (S202) controller 110 transitions from a minimum clock level to a preset VMC level.

More specifically, the controller 110 transitions from the minimum clock level to the VMC level at one time in an on-demand scheme in step 202.

The controller (at S203) 110 determines its current load, at the VMC level.

In this particular example, if the current load at (S203) is equal to or higher than approximately 90% in step 203, then at (S204) the controller 110 determines that the current load corresponds to the first load state, which is the very heavy load state, and thus at (S205) changes its clock level from the VMC level to an RMC level.

More specifically, at (S205) the controller 110 may control transitioning from the VMC level to the RMC level at one time in the on-demand scheme.

However, in this example if at (S203) the current load is below about (i.e. substantially) 90% and equal to or higher than about 70%, the controller 110 determines at (S206) that the current load corresponds to the second load state, in other words, the heavy load state and thus increases the clock level from the VMC level by one RMC level at (S207).

More specifically, the controller 110 at (S207) may control a one-level increase of the clock level from the VMC level in a conservative scheme.

If at (S203) it is determined in this example that the current load is below about 70% and equal to or higher than about 50%, the controller 110 determines that the current load corresponds to the third load state, the light load state at (S208) and at (S209) maintains the VMC level.

If at (S203) it is determined the current load is below about 50%, the controller 110 determines at (S210) that the current load corresponds to the fourth load state, that is, the very light load state and then at (S211) decreases the clock level from the VMC level by one level.

More specifically, at (S211) the controller 110 may control a one-level decrease of the clock level from the VMC level in the conservative scheme.

After changing the clock level from the VMC level in at least one of (S205), (S207), (S209) and (S211), the controller 110 at (S212) processes the generated task at the changed clock level.

Upon completion of the task, at (S213) the controller 110 decreases the clock level at which the task has been processed. More specifically, the controller 110 controls the clock level to be reduced stepwise in the on-demand scheme.

Figure 3:
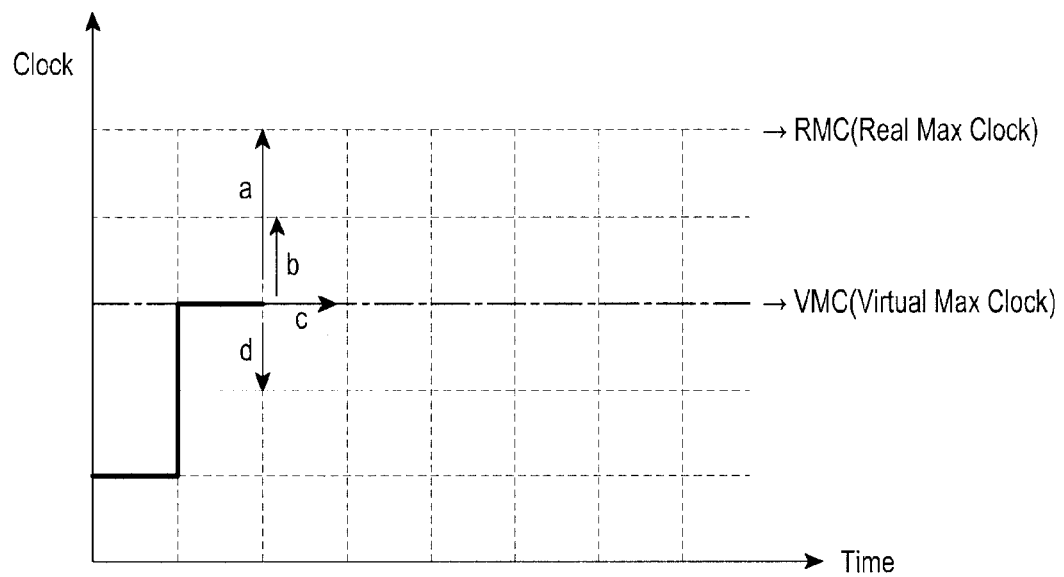
FIGS. 3 to 6C are views graphically illustrating an operation for reducing the current consumption of the controller in the portable terminal according to the exemplary embodiment of the present invention.

FIG. 3 graphically illustrates changing of a clock level from the VMC level according to the load state of the controller in the operation of FIG. 2.

Referring now to FIG. 3, the clock level jumps from the minimum clock level to the preset VMC level at one time in the on-demand scheme. Reference character 'a' denotes a clock changing direction in the first load state of the controller, reference character 'b' denotes a clock changing direction in the second load state of the controller, reference character 'c' denotes a clock changing direction in the third load state of the controller, and reference character 'd' denotes a clock changing direction in the fourth load state of the controller.

Figure 4:
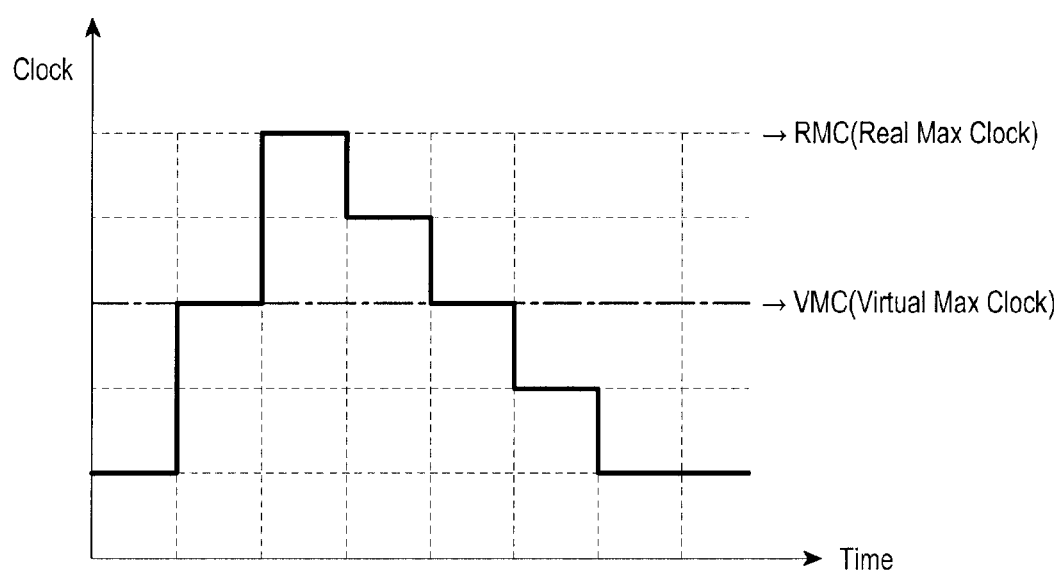

FIG. 4 graphically illustrates changing of a clock level in the first load state, that is, the very heavy load state in the operation of FIG. 2.

Referring now to FIG. 4, after the clock level is changed to the VMC level in FIG. 3, the load state of the controller is determined to be the first load state, that is, the very heavy load state. Thus, the clock level is jumped to the RMC level at one time in the on-demand scheme in the arrowed direction and the task is processed at the RMC level. Then, the clock level is dropped stepwise in the on-demand scheme.

Figure 5:
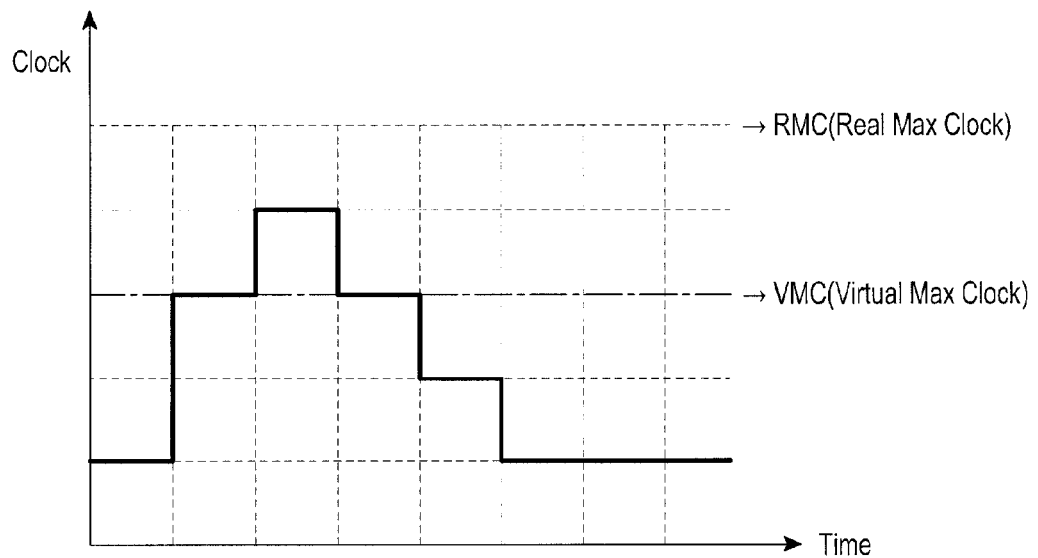

FIG. 5 graphically illustrates changing of a clock level in the second load state, that is, the heavy load state in the operation of FIG. 2.

Referring now to FIG. 5, after the clock level is changed to the VMC level in FIG. 3, the load state of the controller is determined to be the second load state, that is, the heavy load state. Thus, the clock level is increased from the VMC level by one level in the conservative scheme in the arrowed direction b and the task is processed at the one-level increased clock level. Then, the clock level is dropped stepwise in the on-demand scheme.

Figure 6A:
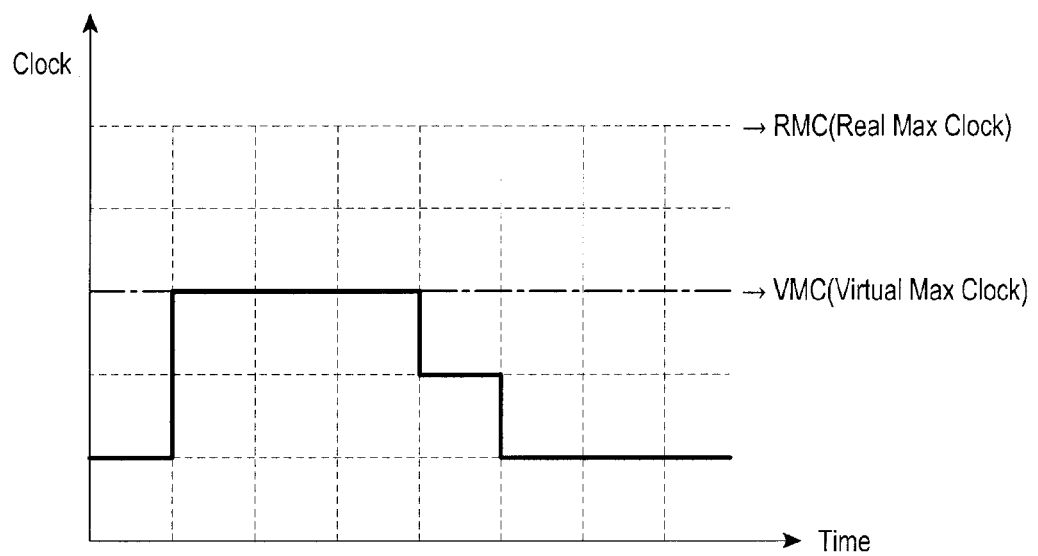
Figure 6B:
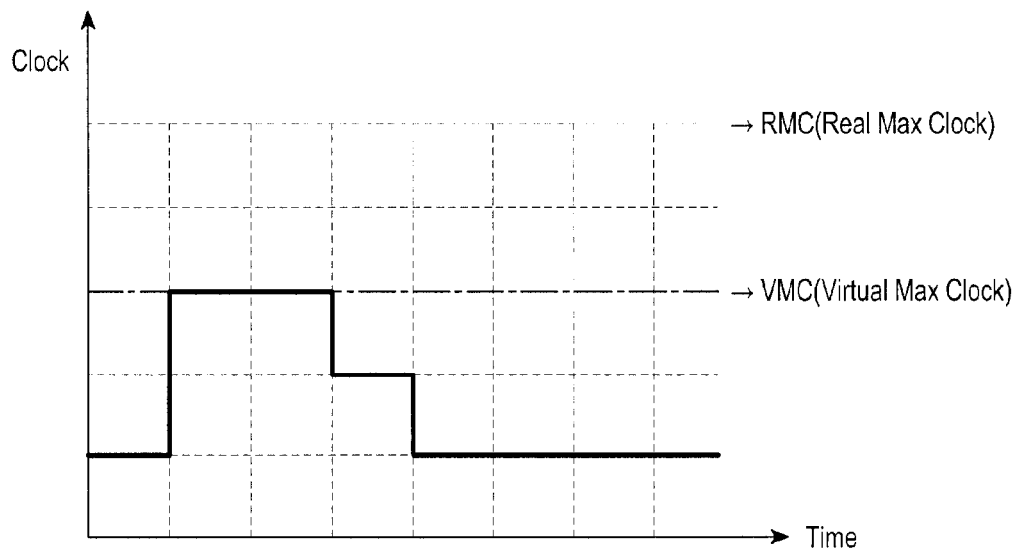

FIGS. 6A and 6B graphically illustrate changing of a clock level in the third load state, that is, the light load state in the operation of FIG. 2.

Referring now to FIGS. 6A and 6B, after the clock level is changed to the VMC level in FIG. 3, the load state of the controller is determined to be the third load state, that is, the light load state. Thus, the task is processed at the VMC level indicated by reference character c and then the clock level is dropped stepwise in the on-demand scheme.

FIGS. 6A and 6B illustrate different operations for dropping the clock level stepwise in the on-demand scheme after the task is processed at the VMC level indicated by reference character c.

Figure 6C:
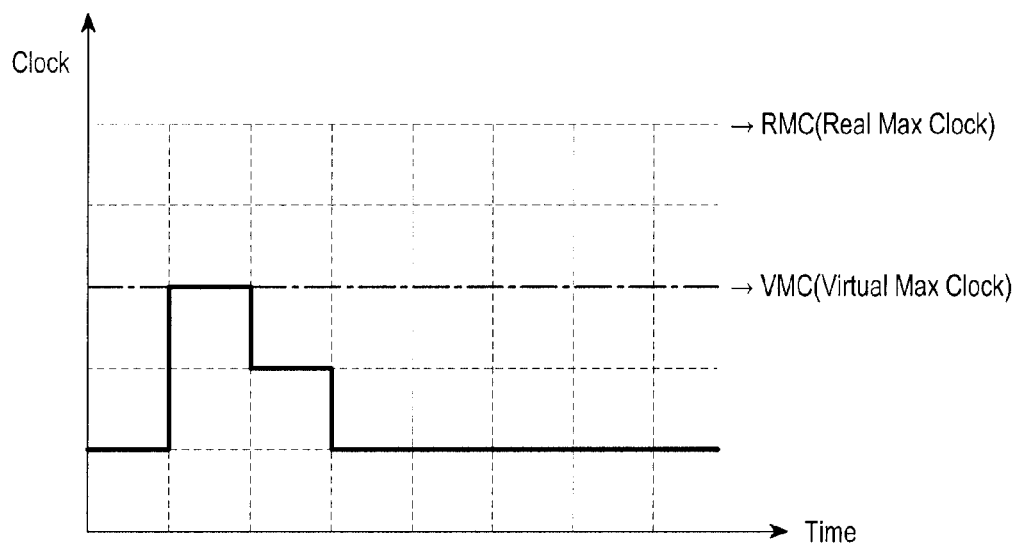

FIG. 6C graphically illustrates changing of a clock level in the fourth load state, that is, the very light load state in the operation of FIG. 2.

Referring now to FIG. 6C, after the clock level is changed to the VMC level in FIG. 3, the load state of the controller is determined to be the fourth load state, that is, the very light load state. Thus, the clock level is decreased from the VMC level by one level in the conservative scheme in the arrowed direction d in FIG. 3) and the task is processed at the one-level decreased clock level. Then, the clock level is dropped stepwise in the on-demand scheme.

Table 1 to Table 7 shown below tabulate current consumption decreases in a portable terminal according to a conventional on-demand scheme (A) and the improved on-demand scheme (B) of the present invention, under the condition that maximum clock frequencies of 1.2 GHz and 1.0 GHz are applied to a 1.2-GHz Crespo terminal.

TABLE 1

|  | 1.2 GHz On-Demand operation (A) | Improved On-Demand operation (B) (1.0 GHz VMC) |
| --- | --- | --- |
| Current consumption (except LCD) | 116.17 | 112.89 |

Table 1 lists current consumption values, when the portable terminal performs Wireless Fidelity (WI-FI) browsing.

TABLE 2

|  | 1.2 GHz On-Demand operation (A) | Improved On-Demand operation (B) (1.0 GHz VMC) |
|---|---|---|
| Current consumption (except LCD) | 217.94 | 192.66 |

Table 2 lists current consumption values, when the portable terminal plays back a video through WI-FI browsing.

TABLE 3

|  | 1.2 GHz On-Demand operation (A) | Improved On-Demand operation (B) (1.0 GHz VMC) |
|---|---|---|
| Current consumption (except LCD) | 310.77 | 300.18 |

Table 3 lists current consumption values, when the portable terminal plays back a video through $3^{rd}$ Generation (3G) browsing.

TABLE 4

|  | 1.2 GHz On-Demand operation (A) | Improved On-Demand operation (B) (1.0 GHz VMC) |
|---|---|---|
| Current consumption (except LCD) | 140.91 | 130.35 |

Table 4 lists current consumption values, when the portable terminal plays back a stored video.

TABLE 5

|  | 1.2 GHz On-Demand operation (A) | Improved On-Demand operation (B) (1.0 GHz VMC) |
|---|---|---|
| Current consumption (except LCD) | 75.15 | 68.09 |

Table 5 lists current consumption values, when the portable terminal opens a reliability-standard MP3 file.

TABLE 6

|  | 1.2 GHz On-Demand operation (A) | Improved On-Demand operation (B) (1.0 GHz VMC) |
|---|---|---|
| Current consumption (except LCD) | 312.92 | 274.02 |

Table 6 lists current consumption values, when the portable terminal records videos in black and white.

TABLE 7

|  | 1.2 GHz On-Demand operation (A) | Improved On-Demand operation (B) (1.0 GHz VMC) |
|---|---|---|
| Current consumption (except LCD) | 184.21 | 160.2 |

Table 7 lists current consumption values, when the portable terminal plays back videos recorded in black and white.

As noted from Table 1 to Table 7, the improved on-demand scheme (B) of the present invention decreases current consumption more than the conventional on-demand scheme (A).

As is apparent from the above description, since the present invention provides an apparatus and method for reducing current consumption in a portable terminal so as to optimize the current consumption of a controller, it can increase the use time of the portable terminal and thus decrease heat emission of the portable terminal. Therefore, the quality and competitiveness of the portable terminal can be increased.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An apparatus comprising:
a controller configured to:
identify a task at a minimum clock rate associated with the controller;
increase, using an on-demand scheme, a clock rate from the minimum clock rate having a non-zero level to a specified clock rate that is higher than the minimum clock rate and less than a maximum clock rate, and
control processing of at least part of the identified task at the specified clock rate if a load state associated with the controller is within a specified value;

determine another load state associated with the controller based at least in part on the task at the specified clock rate; and change the clock rate from the specified clock rate to another clock rate associated with the controller higher than the specified clock rate based at least in part on the another load state associated with the controller.

2. The apparatus of claim 1, wherein the controller is configured to:

perform the task using the another clock rate.

3. The apparatus of claim 2, wherein the controller is configured to:

determine another load state associated with the controller based at least in part on the task performed via the controller; and change the clock rate to another clock rate of a plurality of clock rates associated with the controller according to the another load state; and perform the task performed via the controller using said another clock rate.

4. The apparatus of claim 2, wherein the controller is configured to:

determine another load state associated with the controller based at least in part on another task; and change the clock rate to another clock rate of a plurality of clock rates associated with the controller according to the another load state; and perform another task via the controller using said another clock rate.

5. The apparatus of claim 1, wherein the controller is configured to:

increase the clock rate from the specified clock rate to one of a plurality of clock rates when the load state associated with the controller increases to a value higher than the specified value at the specified clock rate, wherein the one of the plurality of clock rates is higher than the specified clock rate.

6. A method for reducing current consumption in a portable terminal, the method comprising:

identifying a task at a minimum clock rate associated with a controller;

increasing, using an on-demand scheme, a clock rate from the minimum clock rate having a non-zero level to a specified clock rate that is higher than the minimum clock rate and less than a maximum clock rate, and controlling processing of at least part of the identified task at the specified clock rate if a load state associated with the controller is within a specified value;

determining another load state associated with a controller based at least in part on the task at the specified clock rate; and changing the clock rate from the specified clock rate to another clock rate associated with the controller higher than the specified clock rate based at least in part on the another load state.

7. The method of claim 6, further comprising:

performing the task using the another clock rate.

8. The method of claim 7, further comprising:

determining another load state associated with the controller based at least in part on the task performed via the controller; and changing the clock rate to another clock rate of a plurality of clock rates associated with the controller according to the another load state; and performing the task performed via the controller using said another clock rate.

9. The method of claim 7, further comprising:

determining another load state associated with the controller based at least in part on another task; and changing the clock rate to another clock rate of a plurality of clock rates associated with the controller according to the another load state; and performing another task via the controller using said another clock rate.

10. The method of claim 6, wherein changing the clock rate to the another clock rate comprises increasing the clock rate from the specified clock rate to one of a plurality of clock rates when the load state associated with the controller increases to a value higher than the specified value at the specified clock rate, wherein the one of the plurality of clock rates is higher than the specified clock rate.

* * * * *